June 10, 1941.　　　G. H. BINGER　　　2,244,935
CAMP STOVE
Filed Aug. 14, 1939　　　2 Sheets-Sheet 1
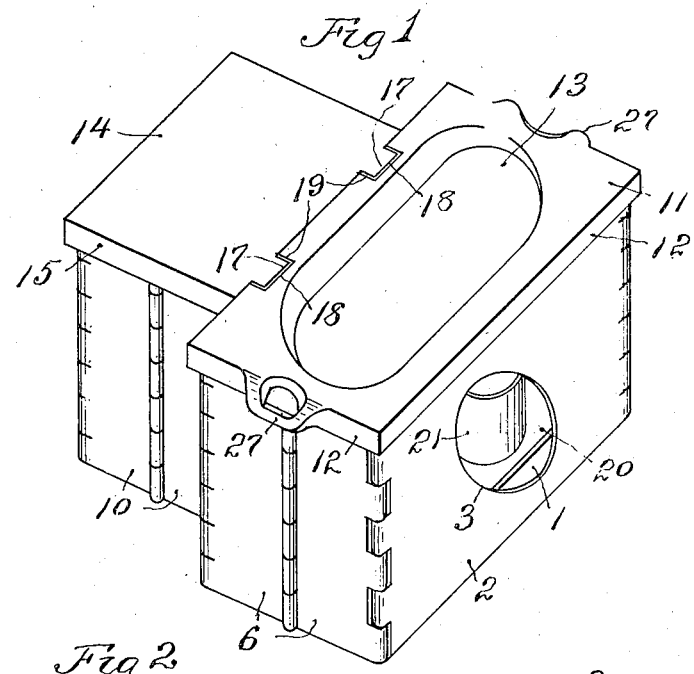
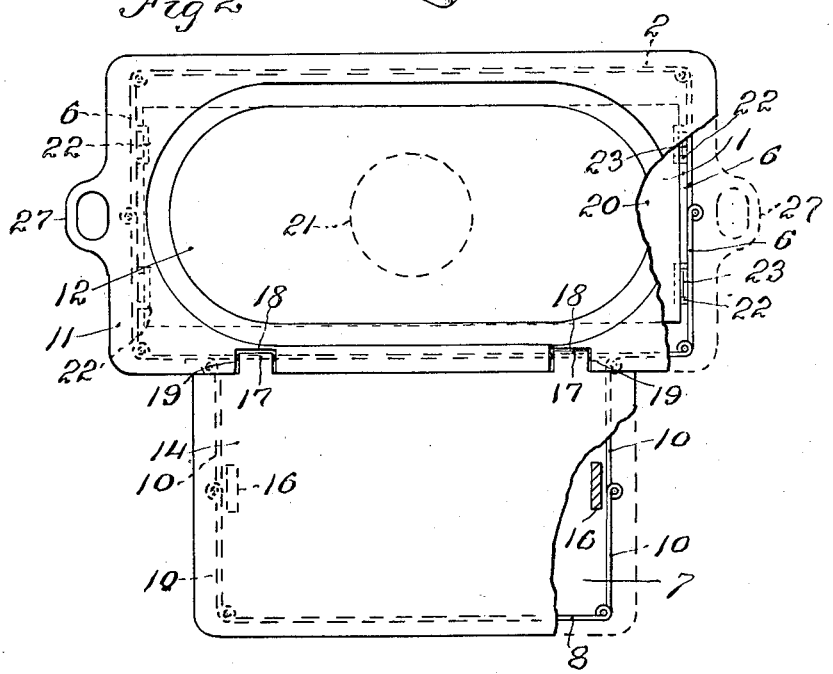
INVENTOR.
Gustave H. Binger
BY Warren D. House
His ATTORNEY.

June 10, 1941.   G. H. BINGER   2,244,935
CAMP STOVE
Filed Aug. 14, 1939   2 Sheets-Sheet 2
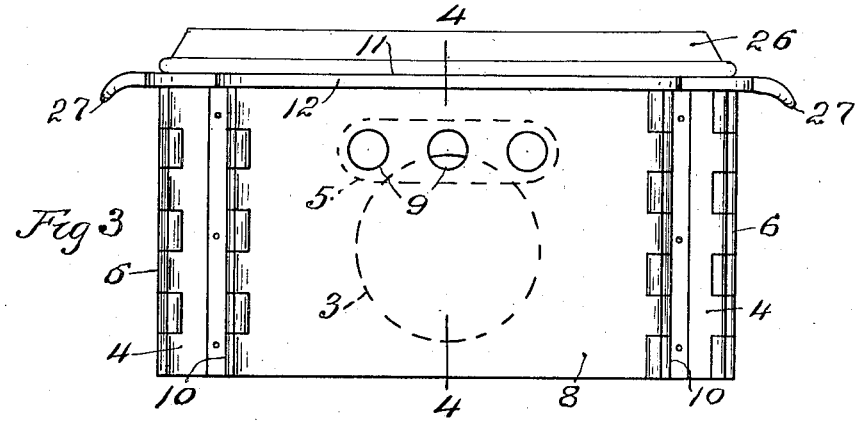
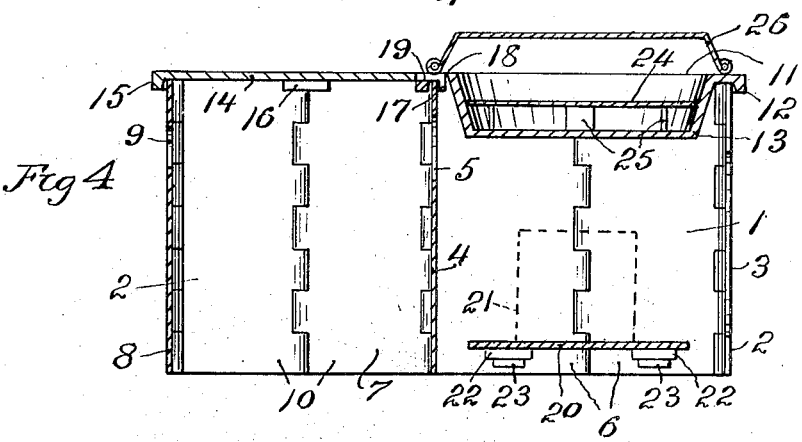
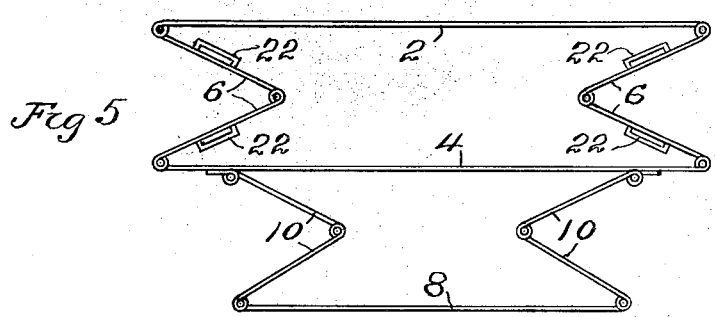
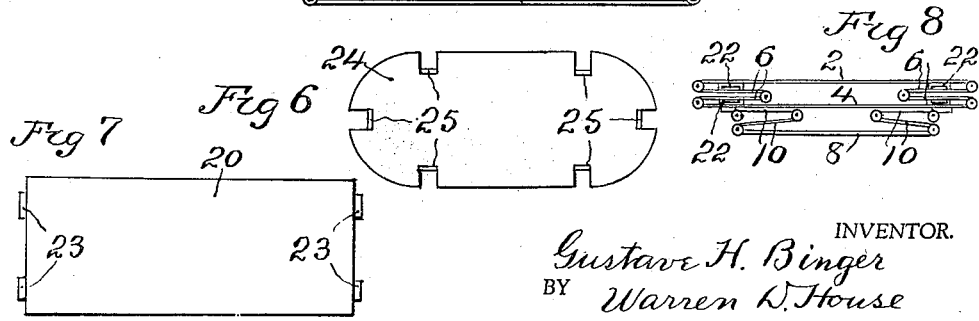
INVENTOR.
Gustave H. Binger
BY Warren D. House
His ATTORNEY.

Patented June 10, 1941

2,244,935

UNITED STATES PATENT OFFICE 2,244,935

CAMP STOVE

Gustave H. Binger, Topeka, Kans., assignor to Lakin Meade, Topeka, Kans.

Application August 14, 1939, Serial No. 290,024

3 Claims. (Cl. 126—9)

My invention relates to improvements in camp stoves. It relates particularly to camp stoves that are collapsible from their operative positions so as to occupy small space.

One of the objects of my invention is the provision of a camp stove of the kind described, which is simple, light, cheap to make, which is strong and durable and not likely to get out of order, which is collapsible to a minimum of space, has few detached parts, and is efficient in operation.

A further object of my invention is the provision of a novel fry pan top member removably disposed over the fire chamber, and which has a depressed grease retaining portion extending into the fire chamber, and which serves the functions of a fry pan and to retain the walls of the fire chamber in their operative position, and in conjunction with an inverted pan covering the depressed portion, serving as an oven.

A further object of my invention is the provision of a novel false bottom for removable insertion into the depressed portion of the fry pan top member spaced from the bottom thereof, for affording a support for biscuit dough to be baked in the aforesaid oven.

A further object of my invention is the provision of novel means for hinging together the walls of the camp stove, so that they may be swung to a collapsed form occupying a minimum of space and all united together, so as to avoid any liability of displacement of parts thereof.

Another object of my invention is the provision of two novel interconnected top members for respectively removably covering the front and rear chambers of the camp stove, and for holding the walls thereof in their operative extended positions.

The novel features of my invention are hereinafter fully described and claimed.

In the accompanying drawings, which illustrate the preferred embodiment of my invention, Fig. 1 is a perspective view of my improved camp stove, the false bottom plate and covering pan being omitted.

Fig. 2 is an enlarged plan view, partly broken away, of what is shown in Fig. 1.

Fig. 3 is a rear elevation of my improved camp stove in operative position, showing the pan cover on the fry pan top member.

Fig. 4 is a longitudinal vertical sectional view through the stove on the line 4—4 of Fig. 3, the fuel can being shown in dotted lines.

Fig. 5 is a top view of the hinged walls of the stove, shown partly collapsed.

Fig. 6 is a reduced bottom view of the false bottom plate.

Fig. 7 is a reduced bottom view of the fuel supporting plate.

Fig. 8 is a reduced top view, showing the hinged walls collapsed to flat form.

Similar characters of reference designate similar parts in the different views.

The stove has a front fire chamber 1 provided with a front wall 2 having a fuel receiving opening 3, a rear wall 4 having adjacent to its upper edge a smoke discharge opening 5, and two side walls each comprising two members 6 hinged to each other and to the adjacent ends respectively of the front wall 2 and rear wall 4 on parallel vertical axes, so as to be adapted to be swung inwardly, accordion-like, as shown in Fig. 5, or outwardly, as may be desired.

The stove has a rear chamber 7 provided with a rear wall 8 having a plurality of smoke discharge openings 9, and two side walls, each comprising two members 10 hinged to each other, the front members 10 being hinged to the rear wall 4, and the rear members 10 being hinged to the adjacent ends respectively of the rear wall 8, which hinge connections have vertical axes, the side wall members 10 being adapted to be swung inwardly, accordion-like, as shown in Fig. 5, or outwardly as may be desired.

When the side wall members 6 and 10 are swung inwardly, the walls may be swung to the flat collapsed position shown in Fig. 8, in which they will occupy a minimum of space, adapting them for storage or transportation.

For covering the fire chamber 1, there is provided a fry pan top member of substantially rectangular form and designated by 11. The top member 11 rests on the upper edges of the walls 2, 4 and 6, and has downwardly extending projections, comprising flanges 12 adapted to releasably engage the outer sides of said walls for holding them from outward movement from their operative position in which they form the substantially rectangular fire chamber 1.

The fry pan top member 11 has a substantially elliptical depressed portion 13 extending downwardly into the fire chamber 1 and adapted to retain grease in liquid form. The depressed portion 13 is of shape and dimensions such that it is adapted to engage by contact with the inner sides of the walls 2, 4 and 6 and releasably hold them from moving inwardly.

For covering the rear chamber 7 there is provided a flat top plate 14 which removably rests on the upper edges of the walls 4, 8 and 10. It has downwardly extending projections comprising flanges 15 adapted to engage the outer sides of the walls 8 and 10 to releasably hold them from outward movement. It has two downwardly extending projections 16 adapted to respectively engage the inner sides of the side wall members 10 for holding them from inward movement.

The forward edge of the top member or plate 14 has two downwardly extending projections 17 adapted to be extended releasably respectively into two holes 18 through the rear edge portion of the top member 11, just forward of the rear wall 4, said top member 11 having at the rear of said holes 18 two depressions 19 in which respectively lie the two right angled projections 17, said depressions 19 being of such depth that the upper side of the top member plate 14 is flush with the upper side of the top member 11, as best shown in Figs. 1, 2 and 4.

For supporting fuel in the fire chamber 1, there is provided a flat rectangular plate 20, Figs. 1, 2, 4 and 7, disposed in the chamber 1 in a horizontal plane lower than the lower end of the front opening 3, and which is adapted to support a can or other container 21 containing fuel to be burned in the fire chamber 1, said can or container 21 having an open top.

For supporting the ends of the plate 20, the inner side of each side wall member 6 is provided, spaced from its lower edge, with a horizontal U shaped bracket 22 on which the plate 20 is removably mounted. The plate 20 has at each end two downwardly extending projections 23 respectively extending downwardly into the two adjacent brackets 22, between the legs thereof. In addition to its function of supporting fuel, the plate 20 holds the lower portions of the side wall members 6 from moving inwardly or outwardly from their operative positions, as shown in Fig. 2.

For supporting biscuit dough, or other material to be cooked, in the depressed portion 13 of the top member 11, raised from the bottom of said portion, there is provided a flat substantially elliptical plate 24, of less longitudinal and transverse diameters than the upper edge of the depressed portion 13, which plate 24 is removably mounted in the depressed portion 13, and which has downwardly extending edge supporting legs 25 which rest on the upper side of the bottom of the depressed portion 13.

For forming with the fry pan top member 11 and oven, there is provided a rectangular pan 26 which is inverted and has its lower edges resting on the top member 11, said pan being of such dimensions that it completely covers the depressed portion 13, thus forming therewith an oven.

The top members 11 and 14 may be of sheet or cast metal, preferably cast iron, and the walls of the front and rear chambers are preferably sheet steel, as are the plates 20 and 24.

In use, the members 6 and 10 of the side walls of the front and rear chambers are swung at right angles to the walls 2, 4 and 8, thus disposing the walls to form the rectangular chambers 1 and 7.

The plate 20 is then disposed in the chamber 1 with its projections 23 extending into the brackets 22. The fry pan top member 11 is then fitted on the upper edges of the walls 2, 4 and 6, with its depressed portion 13 fitted in the fire chamber, and its flanges 12 at the outer sides of the adjacent walls.

The top member 14 is then disposed on the upper edges of the walls 4, 8 and 10 with the downwardly extending portions of the right angled projections extending into the holes 18 of the top member 11, its projections 16 engaging the inner sides of the members 10, and its flanges 15 engaging the outer sides of the walls 8 and 10. The walls of both chambers are thus held in their substantially rectangular operative positions.

Fuel is placed on the plate 20 and ignited, thus heating the top member 11, the heated products of combustion passing from the fire chamber 1 through the opening 5 into the rear chamber 7, and passing therefrom to the atmosphere through the openings 9, whereby the top plate 14 is heated sufficiently for cooking purposes.

If the oven is to be used for baking, the inverted pan 26 is placed on the top member 11 so as to cover the depressed portion 13 thereof, the plate 24 is placed in the depressed portion 13, as has been described.

After use, the top members 11 and 14, pan 26, and plates 20 and 24 and can or container 21 are removed, and the members 6 and 10 of the side walls are swung inwardly to the positions shown in Fig. 8, whereby the walls are collapsed to flat form accordion-like. Or, if desired, the side members 6 and 10 may be swung outwardly until the walls are collapsed.

For convenience in handling, the fry pan top member 11 is provided at its ends respectively with handholds 27, as shown.

By having the side walls 10 hinged to the rear wall 4 of the fire chamber 1, the walls are all held together as a unit, eliminating liability of separate displacement or loss. When the walls are collapsed, the other parts may be piled thereon to form a compact bundle convenient for storage or transportation.

By having the right angled projections 17 at the front edge of the top plate 14 in hooked engagement with the top member 11, the top plate 14 is held from sliding rearwardly from its operative position covering the rear chamber 7.

Many modifications, within the scope of the appended claims, may be made without departing from the spirit of my invention.

What I claim is:

1. A collapsible camp stove having a fire chamber provided with a front wall having a fuel receiving opening, a rear wall having a smoke discharge opening, and two side walls each comprising two members hinged to each other and to the adjacent ends respectively of said front and rear walls, a rear chamber having a rear wall having a smoke discharge opening, the rear chamber having two side walls each comprising two members hinged to each other and to the said two rear walls respectively, the side walls of said two chambers being foldable so as to bring the walls to a flat collapsed position from a substantially rectangular operative position for the walls of each chamber, and two cover members removably mounted over said chambers respectively on the upper edges of the walls thereof and having downwardly extending projections engaging the adjacent ones of said walls for holding said walls from swinging to the collapsed position from their operative positions.

2. A collapsible camp stove having a fire chamber provided with a front wall having a fuel receiving opening, a rear wall having a smoke discharge opening, and two side walls each comprising two members hinged to each other and to the adjacent ends respectively of the front and rear wall, a rear chamber provided with a rear wall having a smoke discharge opening, and two side walls each comprising two members hinged to each other and to said rear walls respectively, the side walls of said two chambers being foldable inwardly substantially parallel with each other and with said front and rear walls to a collapsed position from an operative position in which the walls of the front and rear chambers will form rectangular chambers, a fry pan top member removably mounted on the upper edges of the fire chamber walls, and having a depressed grease retaining portion extending into the fire chamber and engaging and holding the walls thereof in the operative position, and a top member for said rear chamber having hooked engagement with said fry pan member and resting on the upper edges of the walls of the rear chamber and engaging and holding them in operative position.

3. In a collapsible camp stove, a front wall, a rear wall, two side walls each comprising two members hinged to each other and to the adjacent ends respectively of said front and rear walls, said walls in their operative positions forming a substantially rectangular front chamber, another rear wall at the rear of said rear wall, and two side walls each comprising two members hinged to each other and respectively hinged to said two rear walls and forming therewith in their operative position a substantially rectangular rear chamber, said side walls of said two chambers being adapted to be swung inwardly substantially parallel with each other and to said front and rear walls to a flat collapsed position, said front wall having a fuel receiving opening, and the said rear walls having a smoke discharge opening.

GUSTAVE H. BINGER.